United States Patent [19]

Braeger et al.

[11] 4,008,509
[45] Feb. 22, 1977

[54] MACHINE FOR FILLETING FISH

[75] Inventors: Horst Braeger; Gerhard Groth, both of Lubeck, Germany

[73] Assignee: Nordischer Maschinenbau Rud. Baader, Lubeck, Germany

[22] Filed: Dec. 29, 1975

[21] Appl. No.: 644,522

[52] U.S. Cl. .................................................. 17/56
[51] Int. Cl.² .......................................... A22C 25/16
[58] Field of Search ................................ 17/56, 57

[56] References Cited
UNITED STATES PATENTS 2,704,378  3/1955  Schlichting ............................ 17/57
3,570,048  3/1971  Michael ................................. 17/56

Primary Examiner—Hugh R. Chamblee
Attorney, Agent, or Firm—Edward F. Levy

[57] ABSTRACT

In a filleting machine for fish for the production of fillets entirely free of bones and including the belly flaps the tail portions of the fillets are cut free by means of belly filleting knives, back filleting knives and separating knives, the fillets fall down with their tail ends, the back portions of the fillets are cut free by means of back filleting knives and upper pinbone knives and are engaged to drop down, adhering to the belly portions of the fish only at the end of the belly, these adhering portions of the fillets are pressed down by hold down means meanwhile lower pinbone knives are cutting into the fish through the skin portion situated between the upper and the lower pinbone cuts and are cutting free the belly flaps, which will be separated from the skeleton of the fish by means of rib knives, and the strips containing the pinbones are separated from the skeleton by means of strip cutting knives.

3 Claims, 6 Drawing Figures

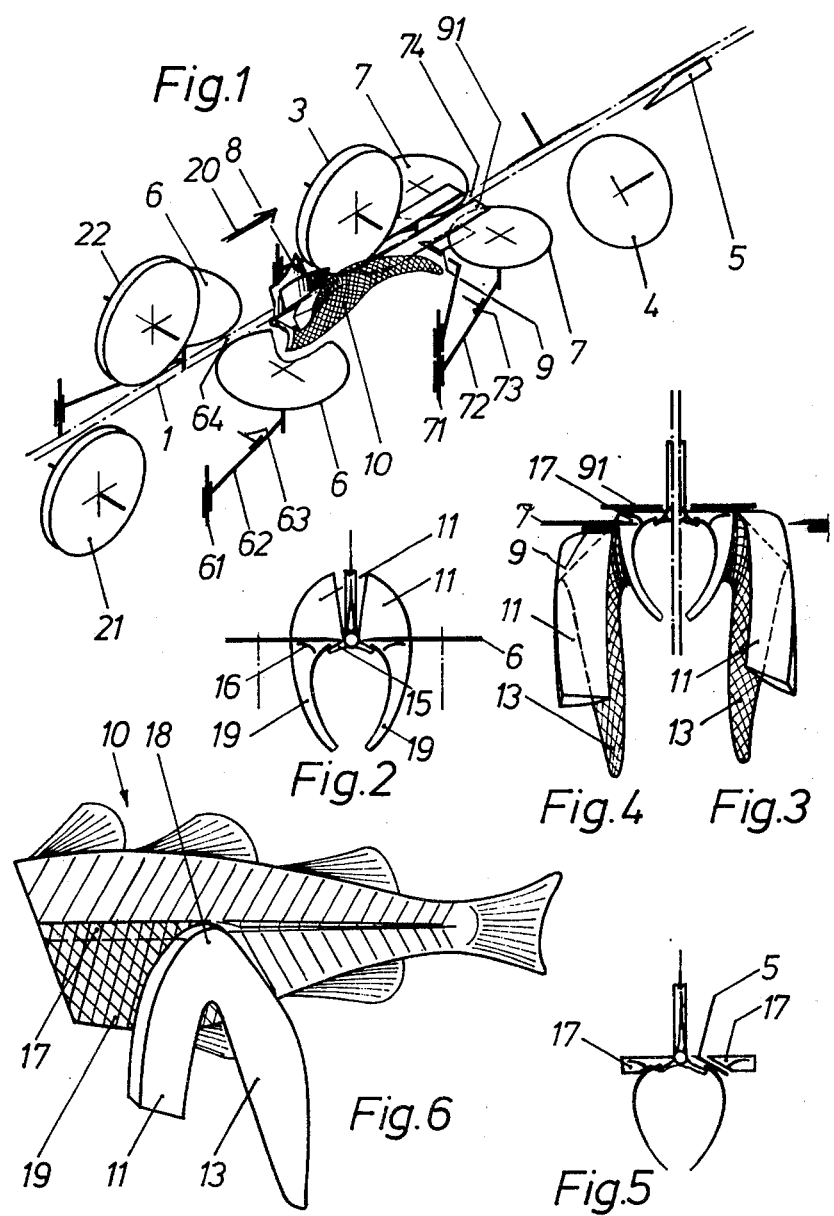

MACHINE FOR FILLETING FISH

BACKGROUND OF THE INVENTION

1. Field of Invention

In mechanical filleting fish two contrary demands have to be met in that fillets entirely free of bones are to be produced on the one hand and no measurable amount of fish meat is allowed to be lost on the other hand.

2. Description of Prior Art

In the German Pat. No. 1,454,082 a filleting machine for fish has a pair of pinbone knives on each side of the path of the fish, the pinbone knives of each pair being arranged in parallel and spaced relation one to another.

In the U.S. Pat. No. 3,570,048 an apparatus for producing fish fillets free of pinbones has two pairs of circular knives set at an angle to each other with their cutting edges almost in contact at the narrowest point.

With a machine or an apparatus of the aforesaid patents fillets of fish may be produced, but occasionally remainders of the pinbones will be found in the fillets making it necessary, to control both cuts in each fillet.

If — in order to overcome this problem — the distance between the two pinbone knives of one pair of pinbone knives or the distance of their cutting edges would be enlarged, another problem would arise, in that there is no possibility of severing the skin of the strip containing the pinbones from the skin of the fillet.

It is a primary object of the invention to produce fillets entirely free of remainders of pinbones and to sever the skin of the strip containing the pinbones from the skin of the fillet.

According to the invention a filleting machine for fish producing fillets of fish including the belly flaps entirely free of bones which has a path for conveying a fish in the direction of its main backbone, means for conveying a fish with its tail end ahead and its belly downwards, a pair of belly filleting knives, a pair of back filleting knives and a pair of separating knives and a pair of rib knives, a pair of upper pinbone knives is arranged between the back filleting knives and the separating knives, a pair of lower pinbones knives is arranged between the separating knives and the rib knives, the upper pinbone knives are cutting in a plane situated above the pinbone of a fish and the lower pinbone knives are cutting in another plane spaced from and lying below the cutting plane of the upper pinbone knives, deflectors for the back muscles of a fish are placed in front of and guiding plates are placed behind the separating knives, the guiding plates extend in the plane of the upper pinbone knives up to the lower pinbone knives, hold down means below and in tight relation to the lower pinbone knives are arranged in front of the latter and control means of known structure are provided operating in dependence on the conveyance of a fish actuating first the two upper pinbone knives to move one against the other as the end of the belly of a fish has passed by, thus making a first pair of incisions above the pinbones, and then the two lower pinbone knives to operate in the same manner to make a second pair of incisions below the pinbones along the belly cavity of the fish.

According to an advantageous embodiment of the invention in a fish filleting machine the rib knives are inclined one to the other and spaced apart with the highest portions of their cutting edges and a pair of strip cutting knives is arranged in the planes extending into the space between the rib knives.

The advantages achieved by the invention are particularly to be seen in the fact, that the fillets produced by the filleting machine are absolutely free of pinbones and need no trimming while the strip containing the pinbones may be handled independently from the fillets, for instance for the production of minced fish.

BRIEF DESCRIPTION OF THE DRAWINGS

FIG. 1 is a perspective diagrammatical view of a filleting machine with pinbone cutting arrangement, FIG. 2 is a cross sectional view of a fish on an enlarged scale in the region of the belly cavity and showing the upper pinbone knives, FIG. 3 is a view of the right side of a fish having left the separating knives, FIG. 4 is a view of the left side of a fish if cut by the lower pinbone knife, FG. 5 is a crosssectional view of the belly portion of the skeleton of a fish wherein the right strip cutting knife has severed the right strip containing the pinbone and FIG. 6 is a view on the right side of a fish just having left the separating knives.

In FIG. 1 a fish 10 is carried and moved in the direction of an arrow 20 along the path 1. Belly filleting knives 21, back filleting knives 22 and upper pinbone knives 6 have made incisions into the fish and separating knives 3 have severed the tail portion 13 of the fish from its skeleton, while deflectors 8 are deflecting the back portion 11 of the fillets to drop down. The upper pinbone knives 6 are supported by swinging arms 62, pivoted at axles 61 and limited in their movement by stops 63, allowing a space 64 between the cutting edges of the upper pinbone knives 6. The fish will be engaged by guiding plates 91 extending in the plane of the upper pinbone knives 6 up to a pair of lower pinbone knives 7, which are supported by swinging arms 72, pivoted at axles 71 and limited in their movement by stops 73, allowing a space 74 between the cutting edges of the lower pinbone knives 7. Hold down means 9 pivoted at axles 71 in the same manner are arranged in front of the lower pinbone knives 7. A pair of rib knives 4 and a pair of strip cutting knives 5 are shown diagrammatically.

In FIG. 2 the crosssection of the fish shows besides two incisions made by the back filleting knives 22 the back portions 11 and the belly flaps 19 of the fillets, the latter containing the two rows of pinbones 16 extending from the vertebral appendages 15 to the skin of the fillets. The upper pinbone knives 6 are shown making incisions above the pinbones 16.

FIG. 3 and FIG. 6 are showing the same phase operation, when the tail portion 13 and the backportion 11 of the right fillet have been severed from the skeleton of the fish and have dropped down, adhering to the belly flaps 19 only near the end of the belly below the bow 18.

In FIG. 4 showing the left side of a fish in the phase following that of FIG. 3, the bow 18 of the dropped down portion of the fillet are pressed down by hold down means 9, meanwhile guiding plate 91 is controlling the fish from above and the lower pinbone knife 7 is severing the skin of the strip 17 containing the pinbones and makes an incision into the fish below the latter.

In FIG. 5 the skeleton of a fish with the adhering strips 17 has reached the strip cutting knife 5, which has separated the strip 17 of the right side.

The invention is not confined to the apparatus described. In particular the rib knives 4 may make the cuts of the strip cutting knives 5 too or may be of the scraping type.

Furthermore supporting means may be provided in front of the lower pinbone knives 7 in the region of hold down means 9 arranged to be liftable for engaging the part of the belly of a fish containing the ribs.

What is claimed is:

1. A filleting machine for producing fillets of fish with the fillets, including the belly flaps, entirely free of pinbones, and in which each fish is conveyed along a path parallel to the main backbone of the fish with its tail leading and belly side down, said machine comprising:
    a pair of belly filleting knives arranged to cut the underside of the fish from the root of the tail fin to the trailing end of the belly cavity,
    a pair of back filleting knives located along said path downstream of said belly filleting knives and arranged to sever the upper part of the fillet above the vertebral column over the entire length of the fish to provide upper fillet portions,
    a pair of upper pinbone knives located along said path downstream of said back filleting knives and arranged to provide a transverse cut above the pinbones of the fish for severing said upper portions from the belly flaps,
    a pair of deflectors located along said path downstream of said upper pinbone knives for deflecting said upper fillet portions outwardly of said belly flaps and causing said upper fillet portions to drop downwardly,
    a pair of separating knives located along said path downstream of said deflectors and arranged to separate the tail portion of said fish from said vertebral column, with said upper fillet portions adhering to the fish skeleton only at an intermediate bow located at the upstream end of the belly cavity,
    hold down means located along said path downstream of said separating knives for pressing down the separated upper fillet portions in the region of the bow below the level of the pinbones of the fish, and
    a pair of lower pinbone knives located along said path downstream of said hold down means for cutting beneath the pinbones and above the held down upper fillet portions, thereby separating a narrow strip containing the pinbones from the fillets, and
    a pair of rib knives located along said path downstream of said lower pinbone knives and arranged to sever the fillets from the fish skeleton, leaving only said narrow strip containing the pinbones remaining on the skeleton.

2. a filleting machine according to claim 1 which also includes a pair of strip cutting knives located along said path downstream of said rib knives and arranged to sever said narrow strip containing the pinbones from the skeleton of the fish.

3. A filleting machine according to claim 2 in which said pair of rib knives are inclined relative to each other to form a space between the highest portion of their cutting edges, said strip cutting knives being located on a plane aligned with said space between said rib knives.

* * * * *